(12) United States Patent
Chang (10) Patent No.: US 10,671,725 B2
(45) Date of Patent: Jun. 2, 2020

(54) MALICIOUS PROCESS TRACKING

(71) Applicant: DiDi Research America, LLC, Mountain View, CA (US)

(72) Inventor: Yinhong Chang, Milpitas, CA (US)

(73) Assignee: DiDi Research America, LLC, Mountain View, CA (US)

( * ) Notice: Subject to any disclaimer, the term of this patent is extended or adjusted under 35 U.S.C. 154(b) by 92 days.

(21) Appl. No.: 15/926,352

(22) Filed: Mar. 20, 2018

(65) Prior Publication Data

US 2019/0294788 A1    Sep. 26, 2019

(51) Int. Cl.
*G06F 21/56*      (2013.01)
*G06F 21/55*      (2013.01)
*G06F 11/34*      (2006.01)

(52) U.S. Cl.
CPC .......... *G06F 21/56* (2013.01); *G06F 11/3466* (2013.01); *G06F 21/554* (2013.01); *G06F 2221/033* (2013.01)

(58) Field of Classification Search
CPC .... G06F 21/56; G06F 11/3466; G06F 21/554; G06F 2221/033
USPC ........................................................ 726/24
See application file for complete search history.

(56) References Cited

U.S. PATENT DOCUMENTS

| | | | |
|---|---|---|---|
| 2006/0075503 A1* | 4/2006 | Bunker ................. | G06F 11/324 726/25 |
| 2010/0077481 A1* | 3/2010 | Polyakov .............. | G06F 21/552 726/24 |
| 2013/0117848 A1 | 5/2013 | Golshan et al. | |
| 2014/0041030 A1* | 2/2014 | Call ........................ | G06F 21/55 726/22 |
| 2014/0165195 A1* | 6/2014 | Brdiczka ............... | G06F 21/552 726/23 |
| 2015/0180883 A1* | 6/2015 | Aktas .................... | H04L 63/145 726/23 |
| 2017/0019418 A1 | 1/2017 | Ikuse et al. | |
| 2017/0324756 A1 | 11/2017 | Adams et al. | |

OTHER PUBLICATIONS

International Search Report and the Written Opinion dated Feb. 19, 2019, issued in International Application No. PCT/US2018/063791 (12 pages).

(Continued)

*Primary Examiner* — Teshome Hailu
(74) *Attorney, Agent, or Firm* — Sheppard Mullin Richter & Hampton LLP (57) ABSTRACT

Malicious processes may be tracked by obtaining process history information of a computing device and obtaining an identification of a malicious software on the computing device. An associated process of the malicious software and actions of the associated process may be identified based on the process history information. Related processes of the associated process and actions of the related processes may be iteratively identified based on the process history information. Tracking information for the malicious software may be generated based on the associated process, the actions of the associated process, the related processes, and the actions of the related processes.

14 Claims, 6 Drawing Sheets

*100*

(56) References Cited

OTHER PUBLICATIONS

Oscar Somarriba et al., "Detection and visualization of android malware behavior", *Journal of Electrical and Computer Engineering*, vol. 2016, Article ID 8034967, Feb. 7, 2016 (17 pages).
Heng Yin et al., "Panorama: Capturing system-wide Information Flow for Malware Detection and Analysis", *Proceedings of the 14th ACM Conference on Computer and Communications Security*, Nov. 2, 2007 (12 pages).

* cited by examiner

MALICIOUS PROCESS TRACKING

TECHNICAL FIELD

The disclosure relates generally to tracking malicious processes.

BACKGROUND

Malicious software removal tools focus on cleaning up files detected to be malicious. For example, when a particular file on a computing device is determined to be malicious, the particular file may be deleted from the computing device. However, such approaches may not account for changes made to the computing device by the malicious software. For example, the malicious software may have been running for a period of time on the computing device and may have made a number of changes on the computing device, such as making changes to the registry of the computing device or downloading/installing other malicious software. As another example, the malicious software may be a backdoor, and a malicious actor may have accessed the computing device via the malicious software to modify the computing device.

SUMMARY

One aspect of the present disclosure is directed to a method for tracking malicious processes. The method may comprise: obtaining process history information of a computing device; obtaining an identification of a malicious software on the computing device; identifying an associated process of the malicious software based on the process history information and the identification of the malicious software on the computing device; identifying actions of the associated process based on the process history information; iteratively identifying related processes of the associated process and actions of the related processes based on the process history information; and generating tracking information for the malicious software based on the associated process, the actions of the associated process, the related processes, and the actions of the related processes.

Another aspect of the present disclosure is directed to a system for tracking malicious processes. The system may comprise one or more processors and a memory storing instructions. The instructions, when executed by the one or more processors, may cause the system to perform: obtaining process history information of a computing device; obtaining an identification of a malicious software on the computing device; identifying an associated process of the malicious software based on the process history information and the identification of the malicious software on the computing device; identifying actions of the associated process based on the process history information; iteratively identifying related processes of the associated process and actions of the related processes based on the process history information; and generating tracking information for the malicious software based on the associated process, the actions of the associated process, the related processes, and the actions of the related processes.

Another aspect of the present disclosure is directed to a non-transitory computer readable medium for tracking malicious processes. The non-transitory computer-readable medium may comprise instructions that, when executed, cause one or more processors to perform: obtaining process history information of a computing device; obtaining an identification of a malicious software on the computing device; identifying an associated process of the malicious software based on the process history information and the identification of the malicious software on the computing device; identifying actions of the associated process based on the process history information; iteratively identifying related processes of the associated process and actions of the related processes based on the process history information; and generating tracking information for the malicious software based on the associated process, the actions of the associated process, the related processes, and the actions of the related processes.

In some embodiments, the processor(s) may be included within a server of a network and the computing device may be a node of the network. The process history information may be periodically generated by the computing device and provided to the server over the network.

In some embodiments, iteratively identifying related processes may include, for a file or a registry created by an identified process, searching for processes that have interacted with the file or the registry. In some embodiments, iteratively identifying related processes may include, for a network communication made by an identified process, searching for processes that have made similar network communications. In some embodiments, iteratively identifying related processes may include, for an identified process which is a service, searching for processes that wrote one or more registry keys associated with the service.

In some embodiments, generating the tracking information for the malicious software may include generating a graph for the malicious software. The graph may include nodes for the actions of the associated process, the related processes, and the actions of the related processes.

In some embodiments, the graph may be filtered based on expected operations of the computing device. In some embodiments, the graph may be filtered based on identification of non-malicious operations.

In some embodiments, a trace of the malicious software may be provided based on the tracking information. In some embodiments, the malicious software may be removed from the computing device based on the tracking information.

These and other features of the systems, methods, and non-transitory computer readable media disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for purposes of illustration and description only and are not intended as a definition of the limits of the invention. It is to be understood that the foregoing general description and the following detailed description are exemplary and explanatory only, and are not restrictive of the invention, as claimed.

BRIEF DESCRIPTION OF THE DRAWINGS

Preferred and non-limiting embodiments of the invention may be more readily understood by referring to the accompanying drawings in which.

DETAILED DESCRIPTION OF THE EMBODIMENTS

Specific, non-limiting embodiments of the present invention will now be described with reference to the drawings. It should be understood that particular features and aspects of any embodiment disclosed herein may be used and/or combined with particular features and aspects of any other embodiment disclosed herein. It should also be understood that such embodiments are by way of example and are merely illustrative of a small number of embodiments within the scope of the present invention. Various changes and modifications obvious to one skilled in the art to which the present invention pertains are deemed to be within the spirit, scope and contemplation of the present invention as further defined in the appended claims.

Figure 1:
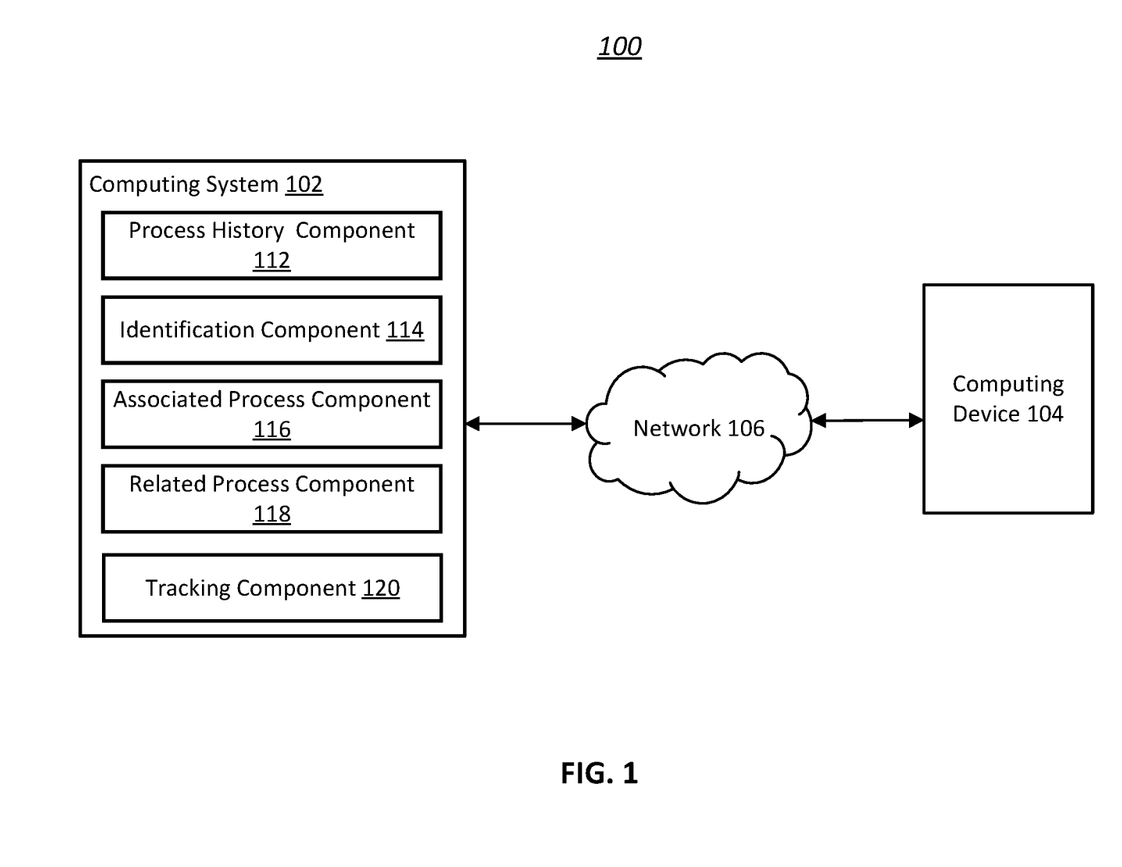
FIG. 1 illustrates an example environment for tracking malicious processes, in accordance with various embodiments of the disclosure.

FIG. 1 illustrates an example environment 100 for tracking malicious processes, in accordance with various embodiments. The example environment 100 may include a computing system 102 (e.g., a server) and a computing device 104 (e.g., a client device, desktop, laptop, smartphone, tablet, mobile device). The computing system 102 and the computing device 104 may include one or more processors and memory (e.g., permanent memory, temporary memory). The processor(s) may be configured to perform various operations by interpreting machine-readable instructions stored in the memory. The computing system 102 and/or the computing device 104 may include other computing resources and/or have access (e.g., via one or more connections/networks) to other computing resources.

The computing system 102 may include a process history component 112, an identification component 114, an associated process component 116, a related process component 118, a tracking component 120 and/or other components. The computing system 102 and the computing device 104 may be connected through one or more networks (e.g., a network 106). The computing system 102 and the computing device 104 may exchange information using the network 106. That is, the computing system 102 may be a server of the network 106 and the computing device 104 may be a node of the network 106. The computing system 102 and the computing device 104 may communicate over the network 106 using one or more communication protocols.

While the computing system 102 and the computing device 104 are shown in FIG. 1 as single entities, this is merely for ease of reference and is not meant to be limiting. One or more components/functionalities of the computing system 102 and/or the computing device 104 described herein may be implemented in a single computing device or multiple computing devices. For example, one or more components/functionalities of the computing system 102 may be implemented in the computing device 104 and/or distributed across multiple computing devices.

The computing device 104 and/or another computing device coupled to the computing device 104 may generate process history information of the computing device 104 and provide the process history information of the computing device 104 to the computing system 102 over the network 106. The computing device 104 and/or another computing device coupled to the computing device 104 may run one or more of software, program, process, agent, and/or other tools to track events that occur at the computing device 104. Such tool(s) may monitor the computing device 104 to collect information about events and/or processes related to events occurring at the computing device 104. Such information may be referred to as process history information. Process history information may characterize processes and/or events of the computing device 104. The tool(s) running on the computing device 104 may observe and record information relating to some or all processes running on the computing device 104, some or all events occurring at the computing device 104, and/or other information relating to processes on the computing device 104. In some embodiments, the process history information may be generated and/or provided in the form of one or more logs (e.g., log of behavior traces). In some embodiments, such tool(s) may act with a certain degree of autonomy to collect and generate process history information of the computing device 104. Such tool(s) may be autonomous and/or work with other tools. Such tool(s) may not require any interaction of a user of the computing device 104. Such tool(s) may invoke one or more tasks on the computing device 104 to collect and generate process history information.

The process history information of the computing device 104 may be periodically generated. The process history information of the computing device 104 may be generated at regular intervals or irregular intervals. The process history information of the computing device 104 may be generated based on detection of relevant events/processes. The process history information of the computing device 104 may be generated based on scan of relevant events/processes. The process history information of the computing device 104 may be generated based on a request for the process history information. Other generation of process history information of the computing device 104 are contemplated.

The process history information of the computing device 104 may be periodically provided to the computing system 102. The process history information of the computing device 104 may be provided to the computing system 102 at regular intervals or irregular intervals. The process history information of the computing device 104 may be provided to the computing system 102 based on detection of relevant events/processes. The process history information of the computing device 104 may be provided to the computing system 102 based on scan of relevant events/processes. The process history information of the computing device 104 may be provided to the computing system 102 based on a request for the process history information. Other provision of process history information of the computing device 104 are contemplated.

The provision of the process history information of the computing device 104 to the computing system 102 may enable analysis of potential malicious software running on the computing device 104 to be performed at the computing system 102. That is malware analysis may occur remotely from the computing system 102/in the cloud. For example, once a malware is detected at the computing device 104, the process history information of the computing device 104 may be used by the computing system 102 to find relevant modifications made by the malware at/through the computing device 104. Collection of the process history information of the computing device 104 may enable a more complete/ thorough detection, analysis, and/or removal of malware/malware effects on the computing device 104.

The process history component 112 may be configured to obtain process history information of the computing device 104 and/or other computing device(s). Obtaining process history information may include one or more of accessing, acquiring, analyzing, determining, examining, loading, locating, opening, receiving, retrieving, reviewing, storing, and/or otherwise obtaining the process history information. For example, the process history component 112 may obtain process history information of the computing device 104 from the computing device 104 and/or another computing device coupled to the computing device 104. The process history component 112 may obtain the process history information directly from the computing device that generated the process history information and/or through one or more intermediary devices (e.g., routers, modems, servers). The process history information may be pushed to the process history component 112 and/or pulled by the process history component 112.

The identification component 114 may be configured to obtain one or more identifications of malicious software on the computing device 104. Malicious software may be an individual program or part of another program. Identification of malicious software may be performed by a malicious software detection tool, such as one or more antivirus/malware engines. For example, presence of malicious software on the computing device 104 may be determined by an antivirus/malware engine based on signatures, string/pattern matching, file hash, blacklist, behavioral rules, and/or other malicious software detection. Other form of malicious software identification are contemplated.

The associated process component 116 may be configured to identify one or more associated processes of the malicious software based on the process history information, the identification of the malicious software on the computing device 104, and/or other information. An associated process of the malicious software may refer to a process related or connected to the malicious software on the computing device 104. For example, an associated process of the malicious software may include a software associated with an event occurring at the computing device when the malicious software is detected. Based on the identification of the malicious software on the computing device 104, the associated process component 116 may analyze the process history information (e.g., logs) to search for the event(s) in which the malicious software was detected and determine the process(es) associated with the event(s) from the process history information. Such identification of the associated process(es) may enable determination of which process(es) should be stopped/removed as being related to the malicious software. However, malicious software may introduce different types of changes at the computing device 104 (e.g., addition of files, removal of files, changes in files) and simply identifying processes associated with the malicious software detection may not provide comprehensive identification of changes made by the malicious software. To provide a more complete/thorough detection, analysis, and/or removal of malicious software/malicious software effects, traces of processes and events provided by the process history information may be used to relevant actions and processes.

The associated process component 116 may be configured to identify actions of the associated process(es) based on the process history information and/or other information. That is, once the associated (malicious) process(es) are identified, the associated process component 116 may use the process history information to track some or all actions taken by the associated process(es) during their lifetime. Tracking of the processes may be documented using one or more graphs (e.g., a tree), where the nodes of the tree represent relevant processes and/or actions. For example, each new piece of data extracted from the process history information may be tracked in a node within a graph. For example, the associated process component 116 may look for some or all of the following actions of the associated process(es) and create a node in the graph for each found action: file(s) written, registry keys created, interprocess commands sent (e.g., WMI, DCOM, DDE), tasks created, child process created, file origins (who wrote a malicious file to disk), process origins (who started the malicious process), network communications made, interprocess interactions (e.g., process injections, process memory modifications). Identifying other actions of the associated process(es) is contemplated. The graph may include a tree-like object data structure which describes the associated process(es) and their action(s) during their lifetime.

The related process component 118 may be configured to iteratively identify related processes of the associated process and actions of the related processes based on the process history information and/or other information. A related process of an associated process may refer to a process that shares one or more characteristics of the associated process, a process that originates from the associated process, a process that created the associated process, and/or other processes related or connected to the associated process. For each associated process identified by the associated process component 116, the related process component 118 may search for related processes and related actions using the process history information. That is, for each process node identified by the associated process component 116, the related process component 118 may use the process history information to track some or all actions taken by the identified process(es) during their lifetime.

Each new piece of data extracted from the process history information may be tracked in a node within the graph. That is, the related process component 118 may look for one or more actions of the related process(es) and create a node in the graph for each found action. Then, for each new process node identified, the related process component 118 may use the process history information to track some or all actions taken by the newly identified process(es) during their lifetime and add the relevant node(s) to the graph. The related process component 118 may continue this search flow to iteratively identify new processes/actions of processes until no additional nodes for the graph are identified. Once no additional nodes are identified, the existing graph may include a tree-like object data structure that provides comprehensive information on what the malicious software did on the computing device 104 and/or did using the computing device 104.

Figure 2:
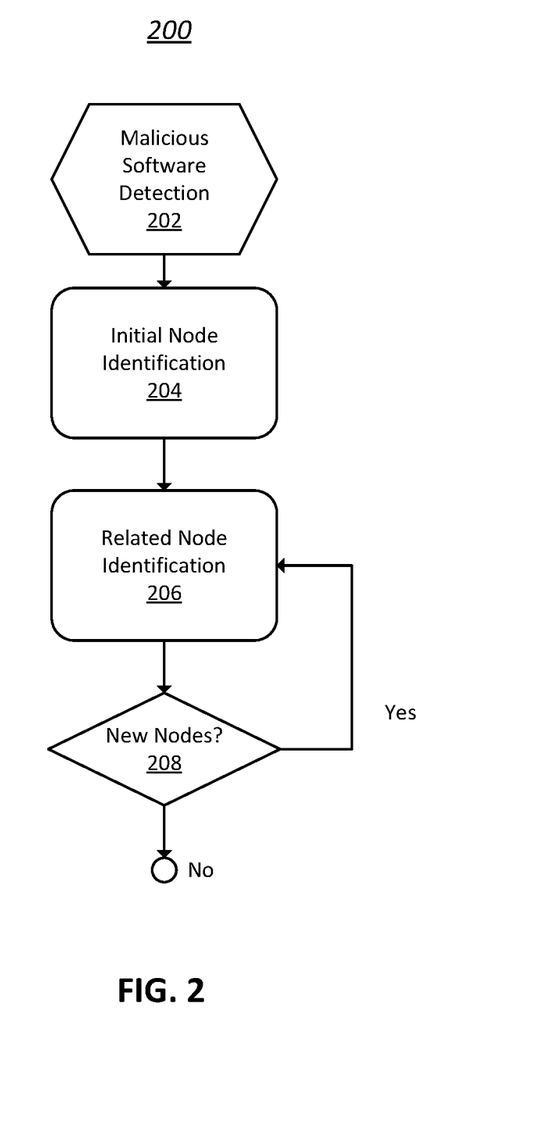
FIG. 2 illustrates an example flow diagram for iterative identification of processes and actions, accordance with various embodiments of the disclosure.

FIG. 2 illustrates an example flow diagram 200 for iterative identification of processes and actions. The process may start with a detection of malicious software on a computing device (block 202). The process may continue with identification of initial node(s) (block 204) in a graph for tracking processes/actions. For example, based on a malware detection event, the process session may be analyzed to identify the associated process(es) to be used as initial node(s) in the tree. The process may continue with identification of related node(s) (block 206). Actions of the identified process(es) may be identified and tracked to identify related processes. If new nodes are identified (block 208), then the process may repeat to identify and track actions of newly identified process(es). If no new nodes are identified (block 208), the iterative identification of processes/actions may be completed.

The iteratively identifying processes and actions based on the process history information may allow for comprehensive collection of information regarding what malicious software did on/using the computing device 104. For example, for a particular process, analysis using the process history information may provide answers to questions such as: what has this process done, what files were created by/because of this process, what/who started this process, and/or other questions relating to the particular process/malicious software. For example, based on the process history information, it may be determined that a particular malicious process was launched by a certain process, and the certain process/actions of the certain process may be analyzed further using the process history information.

In some embodiments, the related process component 118 may look for different types of information within the process history information based on the type of identified process/action. For example, for a file or a registry created by an identified process/action, the related process component 118 may search for processes that have interacted with the file or the registry. For a network communication made by an identified process/action, the related process component 118 may search for processes that have made similar network communications. A similar network communication may refer to a network communication that shares one or more characteristics of the network communication made by the identified process/action, a network communication originating from the network communication made by the identified process/action, a network communication that prompted the network communication made by the identified process/action, and/or other network communications processes related or connected to the network communication made by the identified process/action. For an identified process which is a service, the related process component 118 may search for processes that wrote one or more registry keys associated with the service.

Figure 3:
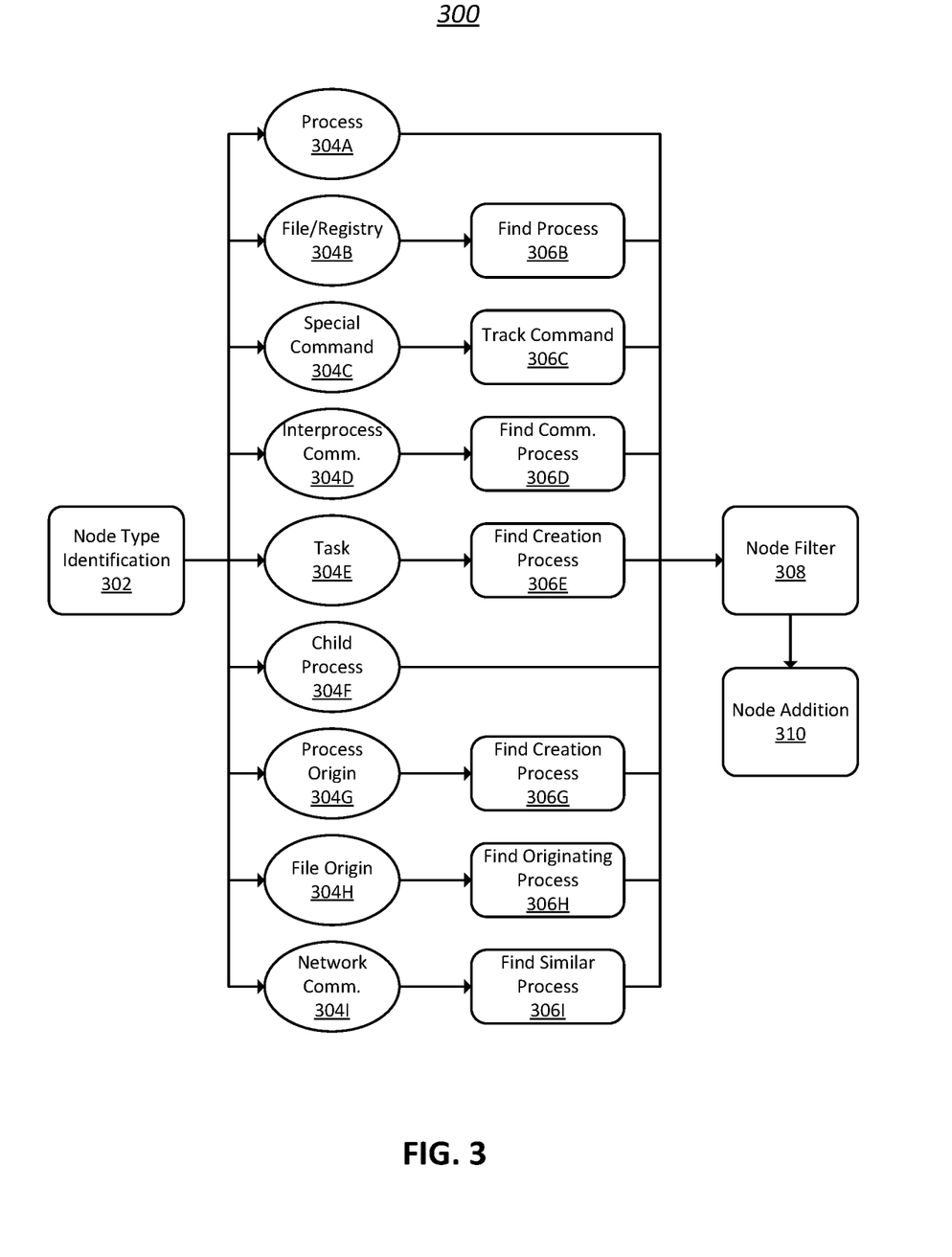
FIG. 3 illustrates an example flow diagram for tracking processes/actions of different types, in accordance with various embodiments of the disclosure.

FIG. 3 illustrates an example flow diagram 300 for tracking processes/actions of different types. The process may start with identification of a node type (block 302). If the node represents a process (block 304A), the node may be filtered (block 308) to remove noise from the graph. If the node represents a file/registry creation/modification (block 304B), processes using the created/modified file/registry may be found (block 306B) and filtered (block 308). If the node represents one or more special commands, such as DDE or WMI (block 304C), the command(s) may be tracked to see if the command(s) produced files/registries/new processes (block 306C), and the produced files/registries/processes may be filtered (block 308). If the node represents interprocess communication (block 304D), the communicating process(es) may be found (block 306D) and filtered (block 308). If the node represents a task (block 304E), the process(es) which created the task may be found (block 306E) and filtered (block 308). If the node represents a child process (block 304F), the node may be filtered (block 308). If the node represents a process origin (block 304G), process(es) which created the process may be found (block 306G) and filtered (block 308). If the node represents a file origin (block 304H), the originating process(es) (e.g., process(es) which modified/wrote the file) may be found (block 306H) and filtered (block 308). If the node represents a network communication (block 304I), process(es) with similar request may be found (block 306I) and filtered (block 308). The filtered results may be added to the graph (block 310).

In some embodiments, the graph may be filtered based on expected operations of the computing device 104, identification of non-malicious operations and/or other information. An expected operation of the computing device 104 may refer to an operation that is known to be part of the normal operation of the computing device. For example, the nodes collected based on iterative identification of related processes and actions may be filtered to weed out noise (false positive/alarm) created by the processes which are known to be part of the normal operation of the computing device 104 and/or determined to not be part of a sequence of malicious operations. As another example, the nodes may be filed based on a list of files/processes/actions that are identified to be non-malicious.

The tracking component 120 may be configured to generate tracking information for the malicious software based on the associated process, the actions of the associated process, the related processes, the actions of the related processes, and/or other information. Tracking information may provide comprehensive information on what the malicious software did on the computing device 104 and/or did using the computing device 104. For example, tracking information may identify changes made by the malicious software on the computing device 104 and/or using the computing device 104. Tracking information may provide a thorough history of the malicious software/malicious software effects, such as by providing traces of processes and/or events relating to the malicious software.

In some embodiments, the tracking component 120 may generate the tracking information for the malicious software by generating one or more graphs for the malicious software. The graph(s) may include nodes for the actions of the associated process, the related processes, and the actions of the related processes. The graph may include a tree-like object data structure which describes the identified process(es) and their action(s) during their lifetime. The tree-like object data structure may provide comprehensive information on the functions of the malicious software. One or more portions of the graph may be used to trace the operations of processes/actions and determine how the malicious software affected the computing device 104 and/or other computing devices coupled to the computing device 104.

In some embodiments, a trace of the malicious software may be provided based on the tracking information. A trace of the malicious software may include tracking of the processes/actions caused by/because of the malicious software. A trace of the malicious software may include logging of information about execution of the malicious software, such as automated tracing of process changes. Such trace of malicious software may be provided and/or used by one or more analysts to uncover information about malicious software.

In some embodiments, the malicious software may be removed from the computing device 104 based on the tracking information. For example, based on a graph of nodes representing what the malicious software did on the computing device 104/using the computing device 104, one or more sets of commands may be executed at/for the computing device 104 to remove/quarantine affected files, fix affected registry keys, terminate affected tasks/processes, and/or otherwise remove the malicious software/effects of the malicious software from the computing device 104. In some embodiments, removal of malicious software may include restoration of affected files/registries from a backup of files (e.g., stored at the computing device 104 and/or other locations, such as a remote storage).

Figure 4:
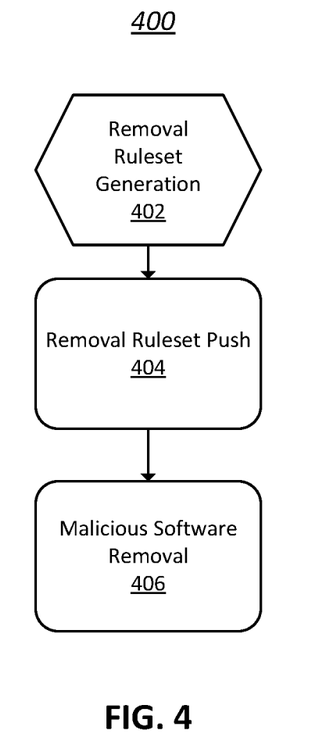
FIG. 4 illustrates an example flow diagram for removing malicious software, in accordance with various embodiments of the disclosure.

FIG. 4 illustrates an example flow diagram 400 for removing malicious software, in accordance with various embodiments of the disclosure. The process may start with generation of removal ruleset (block 402). For example, based on tracking information (graph) for malicious software on the computing device 104, the computing system 102 may determine which ruleset may be used to remove the malicious software from the computing device 106. The ruleset may be determined based on the tracking information. For example, the tracking information may be used to determine which processes, tasks, services, files, registries, and/or other portion of the computing device 104 should be changed (e.g., stopped, quarantined, removed, altered, restored). The removal ruleset may then be pushed to a computing device for execution (block 404). For example, the removal ruleset may be pushed by the computing system 102 to the computing device 104 and/or another computing device coupled to the computing device 104 for execution of the removal ruleset. The malicious software may then be removed from the computing device 104 based on the removal ruleset (block 406). The removal of the malicious software may be executed by the computing device 104 and/or another computing device coupled to the computing device 104.

Figure 5:
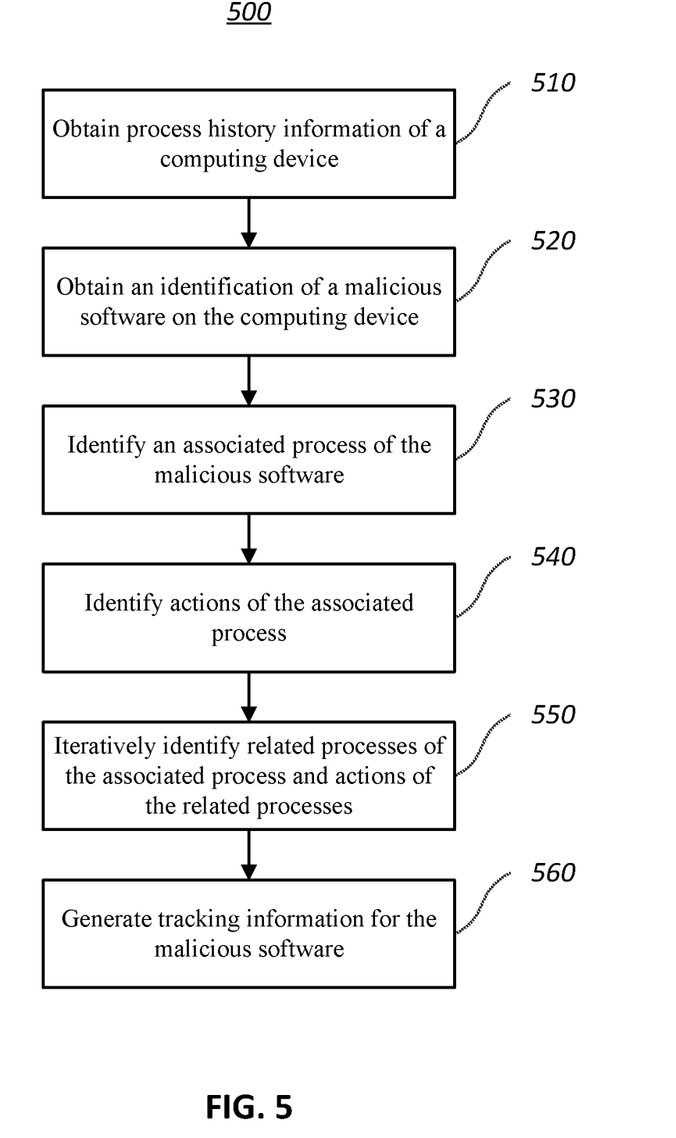
FIG. 5 illustrates a flow chart of example an method, in accordance with various embodiments of the disclosure.

FIG. 5 illustrates a flowchart of an example method 500, according to various embodiments of the present disclosure. The method 500 may be implemented in various environments including, for example, the environment 100 of FIG. 1. The operations of the method 500 presented below are intended to be illustrative. Depending on the implementation, the method 500 may include additional, fewer, or alternative steps performed in various orders or in parallel. The method 500 may be implemented in various computing systems or devices including one or more processors.

With respect to the method 500, at block 510, process history information of a computing device may be obtained. At block 520, an identification of a malicious software on the computing device may be obtained. At block 530, an associated process of the malicious software may be identified based on the process history information and the identification of the malicious software on the computing device. At block 540, actions of the associated process may be identified based on the process history information. At block 550, related processes of the associated process and actions of the related processes may be iteratively identified based on the process history information. At block 560, tracking information for the malicious software may be generated based on the associated process, the actions of the associated process, the related processes, and the actions of the related processes.

Figure 6:
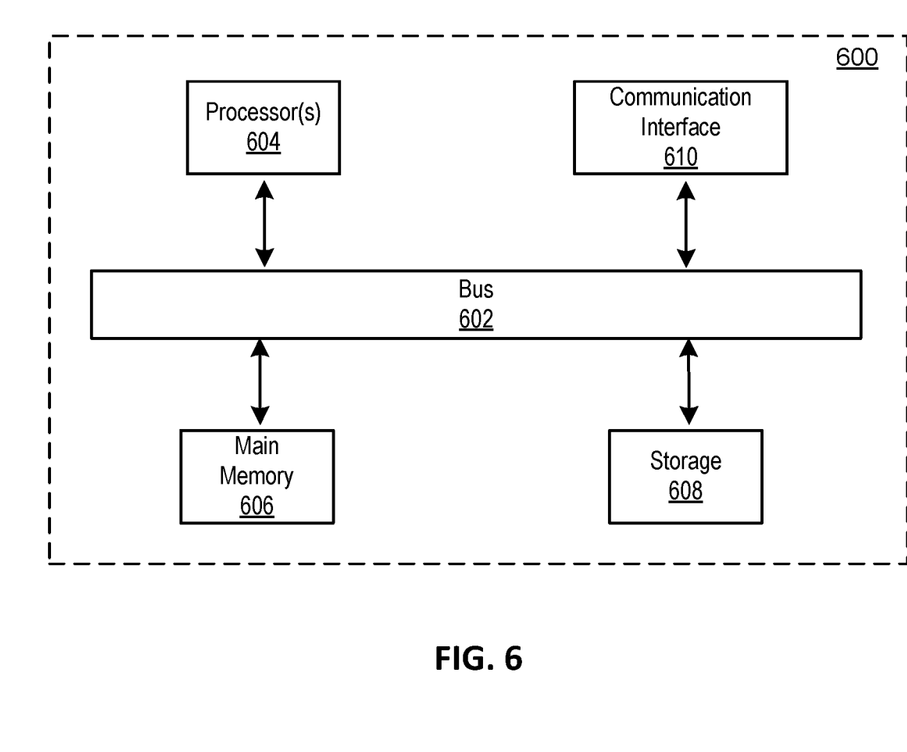
FIG. 6 illustrates a block diagram of an example computer system in which any of the embodiments described herein may be implemented.

FIG. 6 is a block diagram that illustrates a computer system 600 upon which any of the embodiments described herein may be implemented. The computer system 600 includes a bus 602 or other communication mechanism for communicating information, one or more hardware processors 604 coupled with bus 602 for processing information. Hardware processor(s) 604 may be, for example, one or more general purpose microprocessors.

The computer system 600 also includes a main memory 606, such as a random access memory (RAM), cache and/or other dynamic storage devices, coupled to bus 602 for storing information and instructions to be executed by processor(s) 604. Main memory 606 also may be used for storing temporary variables or other intermediate information during execution of instructions to be executed by processor(s) 604. Such instructions, when stored in storage media accessible to processor(s) 604, render computer system 600 into a special-purpose machine that is customized to perform the operations specified in the instructions. Main memory 606 may include non-volatile media and/or volatile media. Non-volatile media may include, for example, optical or magnetic disks. Volatile media may include dynamic memory. Common forms of media may include, for example, a floppy disk, a flexible disk, hard disk, solid state drive, magnetic tape, or any other magnetic data storage medium, a CD-ROM, any other optical data storage medium, any physical medium with patterns of holes, a RAM, a DRAM, a PROM, and EPROM, a FLASH-EPROM, NVRAM, any other memory chip or cartridge, and networked versions of the same.

The computer system 600 may implement the techniques described herein using customized hard-wired logic, one or more ASICs or FPGAs, firmware and/or program logic which in combination with the computer system causes or programs computer system 600 to be a special-purpose machine. According to one embodiment, the techniques herein are performed by computer system 600 in response to processor(s) 604 executing one or more sequences of one or more instructions contained in main memory 606. Such instructions may be read into main memory 606 from another storage medium, such as storage device 608. Execution of the sequences of instructions contained in main memory 606 causes processor(s) 604 to perform the process steps described herein. For example, the processes/methods shown in FIGS. 2-5 and described in connection with these figure can be implemented by computer program instructions stored in main memory 606. When these instructions are executed by processor(s) 604, they may perform the steps as shown in FIGS. 2-5 and described above. In alternative embodiments, hard-wired circuitry may be used in place of or in combination with software instructions.

The computer system 600 also includes a communication interface 610 coupled to bus 602. Communication interface 610 provides a two-way data communication coupling to one or more network links that are connected to one or more networks. As another example, communication interface 610 may be a local area network (LAN) card to provide a data communication connection to a compatible LAN (or WAN component to communicated with a WAN). Wireless links may also be implemented.

The performance of certain of the operations may be distributed among the processors, not only residing within a single machine, but deployed across a number of machines. In some example embodiments, the processors or processor-implemented engines may be located in a single geographic location (e.g., within a home environment, an office environment, or a server farm). In other example embodiments, the processors or processor-implemented engines may be distributed across a number of geographic locations.

While examples and features of disclosed principles are described herein, modifications, adaptations, and other implementations are possible without departing from the spirit and scope of the disclosed embodiments. Also, the words "comprising," "having," "containing," and "including," and other similar forms are intended to be equivalent in meaning and be open ended in that an item or items following any one of these words is not meant to be an exhaustive listing of such item or items, or meant to be limited to only the listed item or items. It must also be noted that as used herein and in the appended claims, the singular forms "a," "an," and "the" include plural references unless the context clearly dictates otherwise.

What is claimed is:

1. A system for tracking malicious processes, the system comprising:
   one or more processors; and
   a memory storing instructions that, when executed by the one or more processors, cause the system to perform:
      obtaining process history information of a computing device;
      obtaining an identification of a malicious software on the computing device;
      identifying an associated process of the malicious software based on the process history information and the identification of the malicious software on the computing device, wherein the associated process creates a file or registry;
      identifying actions of the associated process based on the process history information;
      iteratively identifying one or more related processes that have interacted with the file or registry created by the associated process and actions of the one or more related processes based on the process history information;
      generating tracking information for the malicious software based on the associated process, the actions of the associated process, the one or more related processes, and the actions of the one or more related processes, wherein the tracking information is represented in a graph comprising nodes for the actions of the associated process, the one or more related processes, and the actions of the one or more related processes; and
      filtering the graph based on expected operations of the computing device.

2. The system of claim 1, wherein generating the tracking information for the malicious software includes filtering the graph based on identification of non-malicious operations.

3. The system of claim 1, wherein the instructions further cause the system to perform providing a trace of the malicious software based on the tracking information.

4. The system of claim 1, wherein the instructions further cause the system to perform removing the malicious software from the computing device based on the tracking information.

5. The system of claim 1, wherein:
   the one or more processors are included within a server of a network and the computing device is a node of the network; and
   the process history information is periodically generated by the computing device and provided to the server over the network.

6. The system of claim 1, wherein iteratively identifying one or more related processes includes, for a network communication made by an identified process, searching for processes that have made similar network communications.

7. The system of claim 1, wherein iteratively identifying one or more related processes includes, for an identified process which is a service, searching for processes that wrote one or more registry keys associated with the service.

8. A method for tracking malicious processes, the method implemented by a computing system including one or more processors and non-transitory storage media storing machine-readable instructions, the method comprising:
   obtaining process history information of a computing device;
   obtaining an identification of a malicious software on the computing device;
   identifying an associated process of the malicious software based on the process history information and the identification of the malicious software on the computing device, wherein the associated process creates a file or registry;
   identifying actions of the associated process based on the process history information;
   iteratively identifying one or more related processes that have interacted with the file or registry created by the associated process and actions of the one or more related processes based on the process history information;
   generating tracking information for the malicious software based on the associated process, the actions of the associated process, the one or more related processes, and the actions of the one or more related processes, wherein the tracking information is represented in a graph comprising nodes for the actions of the associated process, the one or more related processes, and the actions of the one or more related processes; and
   filtering the graph based on expected operations of the computing device.

9. The method of claim 8, wherein generating the tracking information for the malicious software includes filtering the graph based on identification of non-malicious operations.

10. The method of claim 8, further comprising providing a trace of the malicious software based on the tracking information.

11. The method of claim 8, further comprising removing the malicious software from the computing device based on the tracking information.

12. The method of claim 8, wherein:
   the one or more processors are included within a server of a network and the computing device is a node of the network; and
   the process history information is periodically generated by the computing device and provided to the server over the network.

13. The method of claim 8, wherein iteratively identifying one or more related processes includes:
   for a network communication made by an identified process, searching for processes that have made similar network communications; and
   for an identified process which is a service, searching for processes that wrote one or more registry keys associated with the service.

14. A non-transitory computer readable medium for tracking malicious processes, the non-transitory computer-readable medium comprising instructions that, when executed, cause one or more processors to perform:
   obtaining process history information of a computing device;
   obtaining an identification of a malicious software on the computing device;
   identifying an associated process of the malicious software based on the process history information and the identification of the malicious software on the computing device, wherein the associated process creates a file or registry;
   identifying actions of the associated process based on the process history information;
   iteratively identifying one or more related processes that have interacted with the file or registry created by the associated process and actions of the one or more related processes based on the process history information;

generating tracking information for the malicious software based on the associated process, the actions of the associated process, the one or more related processes, and the actions of the one or more related processes, wherein the tracking information is represented in a graph comprising nodes for the actions of the associated process, the one or more related processes, and the actions of the one or more related processes; and filtering the graph based on expected operations of the computing device.

\* \* \* \* \*